United States Patent
De Keukelaere et al.

(10) Patent No.: US 8,601,434 B2
(45) Date of Patent: Dec. 3, 2013

(54) METHOD AND SYSTEM FOR INFORMATION PROCESSING AND TEST CASE GENERATION

(75) Inventors: Frederik De Keukelaere, Kanagawa-ken (JP); Michiaki Tatsubori, Kanagawa-ken (JP)

(73) Assignee: International Business Machines Corporation, Armonk, NY (US)

( * ) Notice: Subject to any disclaimer, the term of this patent is extended or adjusted under 35 U.S.C. 154(b) by 91 days.

(21) Appl. No.: 13/093,056

(22) Filed: Apr. 25, 2011

(65) Prior Publication Data

US 2012/0030516 A1  Feb. 2, 2012

(30) Foreign Application Priority Data

Apr. 30, 2010  (JP) .................................. 2010-105181

(51) Int. Cl.
*G06F 9/44* (2006.01)
(52) U.S. Cl.
USPC ........................................................ 717/106
(58) Field of Classification Search
USPC .................................. 717/124–135, 106–109
See application file for complete search history.

(56) References Cited

U.S. PATENT DOCUMENTS

| | | | | |
|---|---|---|---|---|
| 6,185,701 | B1* | 2/2001 | Marullo et al. | 714/38.14 |
| 6,502,235 | B1* | 12/2002 | Tosaka et al. | 717/126 |
| 2004/0133881 | A1* | 7/2004 | Chamberlain et al. | 717/125 |
| 2006/0101404 | A1* | 5/2006 | Popp et al. | 717/124 |
| 2008/0127094 | A1* | 5/2008 | Squires et al. | 717/124 |
| 2008/0127097 | A1* | 5/2008 | Zhao et al. | 717/124 |
| 2008/0247363 | A1* | 10/2008 | Lee et al. | 370/335 |
| 2009/0125976 | A1* | 5/2009 | Wassermann et al. | 726/1 |
| 2010/0313187 | A1* | 12/2010 | Tan et al. | 717/131 |

FOREIGN PATENT DOCUMENTS

CN  1152 1899 A  9/2009

OTHER PUBLICATIONS

Di Lucca, G.A.; Fasolino, A.R.; Faralli, F.; De Carlini, U.;, "Testing Web applications," Software Maintenance, 2002. Proceedings. International Conference on Software Maintenance, pp. 310-319, 2002.*
Wang, et al., "A Static Analysis Approach for Automatic Generating Test Cases for Web Applications," 2008 International Conference on, vol. 2, No., pp. 751-754, Dec. 2008.
Podjarny, G., "Developing secure Web applications: An introduction to IBM Rational AppScan Developer Edition," IBM DeveloperWorks, Sep. 2008.
Tateishi T., et al., "DHTML Accessibility Checking Based on Static JavaScript Analysis," LNCS Universal Access in Human-Computer Interaction. Applications and Services 2007.

* cited by examiner

*Primary Examiner* — Anna Deng
(74) *Attorney, Agent, or Firm* — Scully, Scott, Murphy & Presser, P.C.; Gail H. Zarick, Esq.

(57) ABSTRACT

A method and system for information processing and test case generation. The system includes: a pattern storage module for storing at least one resource identifier patterns, where the resource identifier patterns are extracted from a server code of a web application by analyzing the server code; a client code analyzer module for analyzing a client code generated from the server code and finding at least one event sequences matching with the resource identifier patterns; and a test case generator module for fetching a client state established from the client code, executing the event sequences on the client state, and generating a test case, where the test case includes a second resource identifier generated as an execution result of the event sequence.

18 Claims, 9 Drawing Sheets

SERVER CODE 1
(http://localhost/page_1.jsp)

```
<html>
 <body>
  <form method=get>
    What's your guess?
    <input type=text name=a>
    <input type=text name=b>
     <input type=submit value="submit">
  </form>
  <%
    // for simplicity ignore conversion>
    int a = request.getParameter ("a") ;
    int b = request.getParameter ("b") ;
    int c = request.getParameter ("c") ;
    int d = request.getParameter ("d") ;

if (a>b) {
  %>
   <jsp:forward page="page_2.jsp"/>
   <%}%>
   <%if (c>d) {%>
   <% = c+d; %>
   <%}%>
  </body>
</html>
```

CLIENT CODE 1
(http://localhost/page_1.jsp)

```
<html>
 <body>
  <form method=get>
    What's your guess?
    <input type=text name=a>
    <input type=text name=b>
     <input type=submit value="submit">
  </form>
 </body>
</html>
```

(B)

CLIENT CODE 2
(http://localhost/page_2.jsp)

```
<html>
 <body>
   <form action="page_1.jsp" method=get>
     What's your guess?
     <input type=text name=c>
     <input type=text name=d>
      <input type=submit value="submit">
   </form>
  </body>
</html>
```

(C)

SERVER CODE 2
(http://localhost/page_2.jsp)

```
<html>
 <body>
   <form action="page_1.jsp" method=get>
     What's your guess?
     <input type=text name=c>
     <input type=text name=d>
      <input type=submit value="submit">
   </form>
  </body>
</html>
```

Server (http://localhost/)

```
page_x.jsp
    // see client code page_y.jsp
    return "no new mail" ;

page_z.jsp
    return "hello again" ;
```

(A)

Client (http://localhost/page_x.jsp)

```
        function async_check_mail () {
           while (true)
                // request page_y to check mail
              // sleap
        } function button_click () {
           // request page_z
        }
```

(B)

FIG. 8

METHOD AND SYSTEM FOR INFORMATION PROCESSING AND TEST CASE GENERATION

CROSS-REFERENCE TO RELATED APPLICATION

This application claims priority under 35 U.S.C. §119 from Japanese Patent Application No. 2010-105181 filed Apr. 30, 2010, the entire contents of which are incorporated herein by reference.

BACKGROUND OF THE INVENTION

1. Field of the Invention

The present invention relates to a software test technique. More particularly, the Present Invention is related to an information processing and a test case generating method and system that automatically generates test cases for software testing of a web application.

2. Description of Related Art

With the recent development of the Internet, various services such as online banking, online trading, net shopping and electric bulletin board have been provided through web applications. In particular, with the recent development of web technologies, the web applications, which used to provide sets of static contents at the early development stage, have been changed to provide contents dynamically and interactively. In addition, increasingly richer and more dynamic contents have been provided with the development of client technologies such as JavaScript, Asynchronous JavaScript (registered trademark) and XML (Ajax) and Adobe (registered trademark) Flash (registered trademark).

Under circumstances where web applications have become more and more complex, a test technique effective to conventional software has become ineffective due to dynamic properties of the web applications, and it has become difficult to thoroughly verify the web applications. Thus, in order to perform thorough software testing of a web application, many steps of the test need to be performed manually. This is a factor of increase of labor costs in application development. In addition, costs required for bug fixes increase with the progress of developmental phase. Against such a background, it is desirable to develop a test tool which makes it possible to efficiently perform thorough software testing of a dynamic web application.

It is known that techniques of automating a web application software test have been developed by widely applying techniques mainly based on static analysis or dynamic analysis (Podjarny, G., "Developing secure Web applications: An introduction to IBM Rational AppScan Developer Edition," IBM DeveloperWorks, September 2008). The dynamic analysis is a technique of finding a security hole by traversing a web application to learn the structure and behaviors of the web application, and by submitting unexpected inputs. The dynamic analysis is so-called black box testing, and thus does not require server-side source code and information on operations of the web application.

In contrast, the static analysis is a technique of identifying security vulnerabilities by analyzing application code to construct a mathematical model describing the application, and then by analyzing the model. The static analysis is so-called white box testing, and thus requires application code. However, since the code itself is statically scanned, the code coverage is clearly defined. Attempts have also been made to extract uniform resource locators (URLs) and input parameters from character strings in the server-side code by statically analyzing the server-side code (Minghui Wang, et al., "A Static Analysis Approach for Automatic Generating Test Cases for Web Applications," Computer Science and Software Engineering, 2008 International Conference on, vol. 2, no., pp. 751-754, 12-14 Dec. 2008). In addition, in relation to static code analysis of client code, there is known a technique of verifying JavaScript (registered trademark) in client code such as DHML (Tateishi T., et al., "DHTML Accessibility Checking Based on Static JavaScript Analysis," LNCS Universal Access in Human-Computer Interaction. Applications and Services, Volume 4556 p167-176, 2007).

However, in the aforementioned static analysis, it is difficult to correctly predict from server code what client code is to be generated. Finding all the code paths by using static analysis is difficult because of the dynamic code on the client side. Furthermore, some codes do not appear when the server code is analyzed alone.

In addition, an event tree which expresses possible interactions with a web application grows dynamically and exponentially. For this reason, a dynamic analysis to search a web application thoroughly without any omission is unrealistic, and also has a possibility of going into an infinite loop. To alleviate the mentioned problem above, dynamic analysis is also performed by searching only limited part of a web application through simulation of execution results of JavaScript (registered trademark) code on the client side. The code coverage of this dynamic analysis, however, can be incomplete.

SUMMARY OF THE INVENTION

Accordingly, one aspect of the present invention provides an information processing system that generates a test case for a web application, the system including: a pattern storage module for storing at least one resource identifier patterns, where the resource identifier patterns are extracted from a server code of a web application by analyzing the server code; a client code analyzer module for analyzing a client code generated from the server code and finding at least one event sequences matching with the resource identifier patterns; and a test case generator module for fetching a client state established from the client code, executing the event sequences on the client state, and generating a test case, where the test case includes a second resource identifier generated as an execution result of the event sequence.

Another aspect of the present invention provides a method for generating test case for a web application, the method including the steps of: storing at least one resource identifier patterns, where the resource identifier patterns are extracted from a server code of a web application by analyzing the server code; analyzing a client code generated from the server code; finding at least one event sequences matching with the identifier patterns; fetching a client state established from the client code; executing the event sequences on the client state; and generating a test case, where the test case includes a second resource identifier generated as an execution result of the event sequence.

Another aspect of the present invention provides a computer readable storage medium tangibly embodying a computer readable program code having computer readable instructions which when implemented, cause a computer to carry out the steps of a method including: storing at least one resource identifier patterns, where the resource identifier patterns are extracted from a server code of a web application by analyzing the server code; analyzing a client code generated from the server code; finding at least one event sequences matching with the identifier patterns; fetching a client state established from the client code; executing the event sequences on the client state; and generating a test case, where the test case includes a second resource identifier generated as an execution result of the event sequence.

BRIEF DESCRIPTION OF THE DRAWINGS

FIGS. 5A to 5C show a server code (5A) of the web application to be tested and generated client code (5B and 5C) of the web application.

FIGS. 8A and 8B show a pseudo code of server code (8A) and generated client code (8B) of the web application to be tested.

DETAILED DESCRIPTION OF THE PREFERRED EMBODIMENT

Figure 1:
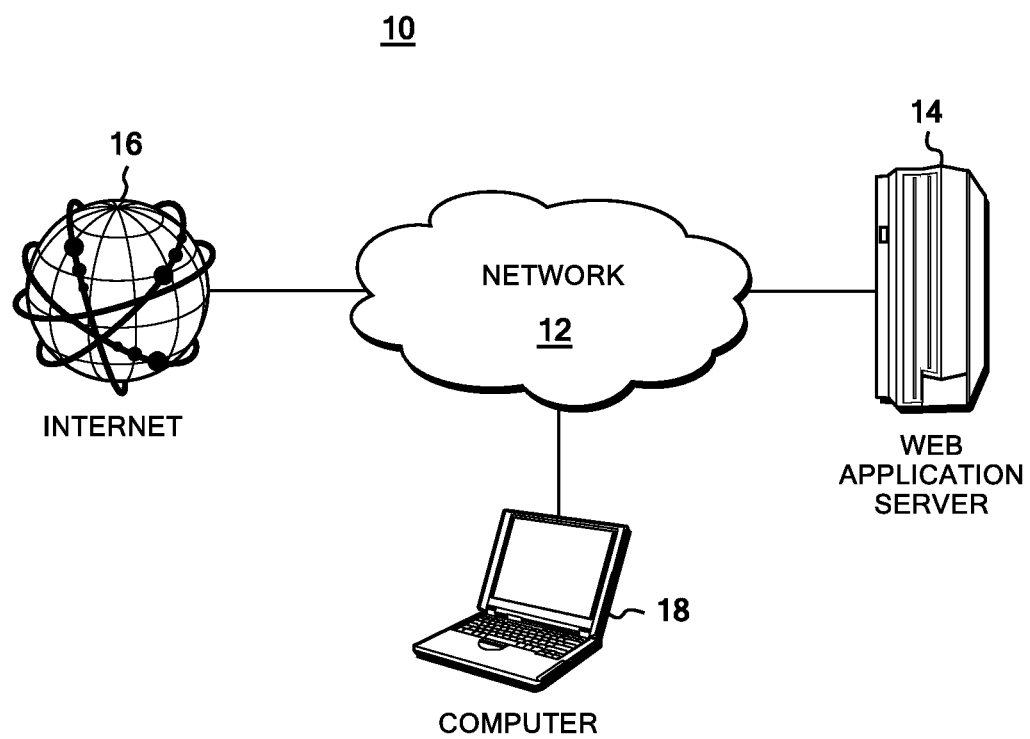
FIG. 1 shows a schematic diagram of a test environment, of a web application, including a computer according to an embodiment of the present invention.

The above and other features of the present invention will become more distinct by a detailed description of embodiments shown in combination with attached drawings. Identical reference numbers represent the same or similar parts in the attached drawings of the invention.

As will be appreciated by one skilled in the art, aspects of the present invention can be embodied as a system, method or computer program product. Accordingly, aspects of the present invention can take the form of an entirely hardware embodiment, an entirely software embodiment (including firmware, resident software, micro-code, etc.) or an embodiment combining software and hardware aspects that can all generally be referred to herein as a "circuit," "module" or "system." Furthermore, aspects of the present invention can take the form of a computer program product embodied in one or more computer readable medium(s) having computer readable program code embodied thereon.

Any combination of one or more computer readable medium(s) can be utilized. The computer readable medium can be a computer readable signal medium or a computer readable storage medium. A computer readable storage medium can be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium can include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium can be any tangible medium that can contain, or store a program for use by or in connection with an instruction execution system, apparatus, or device.

A computer readable signal medium can include a propagated data signal with computer readable program code embodied therein, for example, in baseband or as part of a carrier wave. Such a propagated signal can take any of a variety of forms, including, but not limited to, electro-magnetic, optical, or any suitable combination thereof. A computer readable signal medium can be any computer readable medium that is not a computer readable storage medium and that can communicate, propagate, or transport a program for use by or in connection with an instruction execution system, apparatus, or device.

Program code embodied on a computer readable medium can be transmitted using any appropriate medium, including but not limited to wireless, wireline, optical fiber cable, RF, etc., or any suitable combination of the foregoing.

Computer program code for carrying out operations for aspects of the present invention can be written in any combination of one or more programming languages, including an object oriented programming language such as Java, Smalltalk, C++ or the like and conventional procedural programming languages, such as the "C" programming language or similar programming languages. The program code can execute entirely on the user's computer, partly on the user's computer, as a stand-alone software package, partly on the user's computer and partly on a remote computer or entirely on the remote computer or server. In the latter scenario, the remote computer can be connected to the user's computer through any type of network, including a local area network (LAN) or a wide area network (WAN), or the connection can be made to an external computer (for example, through the Internet using an Internet Service Provider).

Aspects of the present invention are described below with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions can be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions can also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

The computer program instructions can also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

FIG. 1 shows a schematic diagram of a test environment 10, of a web application, including a computer 18 according to the embodiment of the present invention. In the test environment 10 shown in FIG. 1, a computer 18 is connected to a web application server 14 and the Internet denoted by reference numeral 16, via a network 12. The network 12 is configured as a local area network (LAN) using, TCP/IP and Ethernet (registered trademark), a wide area network (WAN) using a virtual private network (VPN) or a dedicated line, or the like.

The computer 18 is generally configured as a general-purpose computer such as a personal computer or a workstation. More specifically, the computer 18 includes a central processing unit (CPU) such as a single-core processor or a multi-core processor, a cache memory, a RAM, a network interface card (NIC), a storage device and the like. The computer 18 operates under control of an appropriate operating system (hereinafter, referred to as an OS) such as WINDOWS (registered trademark), UNIX, (registered trademark) or LINUX (registered trademark). Likewise, the web application server 14 is generally configured as a computer such as a personal computer, a workstation, or a rack mount or blade server.

A web application or modules thereof to be subjected to a software test of this embodiment (hereinafter, referred to as a target application) are loaded locally onto the computer 18 which implements the software test tool or loaded onto the web application server 14, although the configuration is not particularly limited.

The target application implements a server program such as Java (registered trademark) Server Pages (JSP), Active Server Pages (ASP) or Hypertext Preprocessor (PHP), and is configured to process HTTP requests from a web client by using an HTTP protocol. More specifically, in response to an HTTP request from the web client, the target application generates HTML data, XML data or the like (hereinafter, referred as client code) in accordance with source code, and returns an HTTP response. The client code can also be generated by utilizing information provided in cooperation between a server program and a database (not shown) connected to the target application, another web application on the Internet 16, a web service or the like.

As web application becomes complicated, it becomes difficult to correctly predict the client code from the source code of the server program (hereinafter, referred as server code), when one dynamically generates a client code from the server code. In addition, since the client code can be generated infinitely, code coverage serving as a measure of the achievement degree of the test is not definite, and thus tracing the test for obtaining accurate code coverage becomes difficult.

To solve these problems, an embodiment of the present invention, by statically analyzing the server code, provides the code coverage of the static server code that is appropriately guaranteed. In addition, for a server code to dynamically generate client code and to develop an application code for the client side, test cases which cover the server codes as test target codes are generated by further analyzing the client code. In this manner, the code coverage in the entire target application is made clear Furthermore, the test cases are dynamically generated, which means that test cases are generated from an object while interacting with the currently running target application. Therefore, a correct and efficient verification of the code coverage is achieved.

Figure 2:
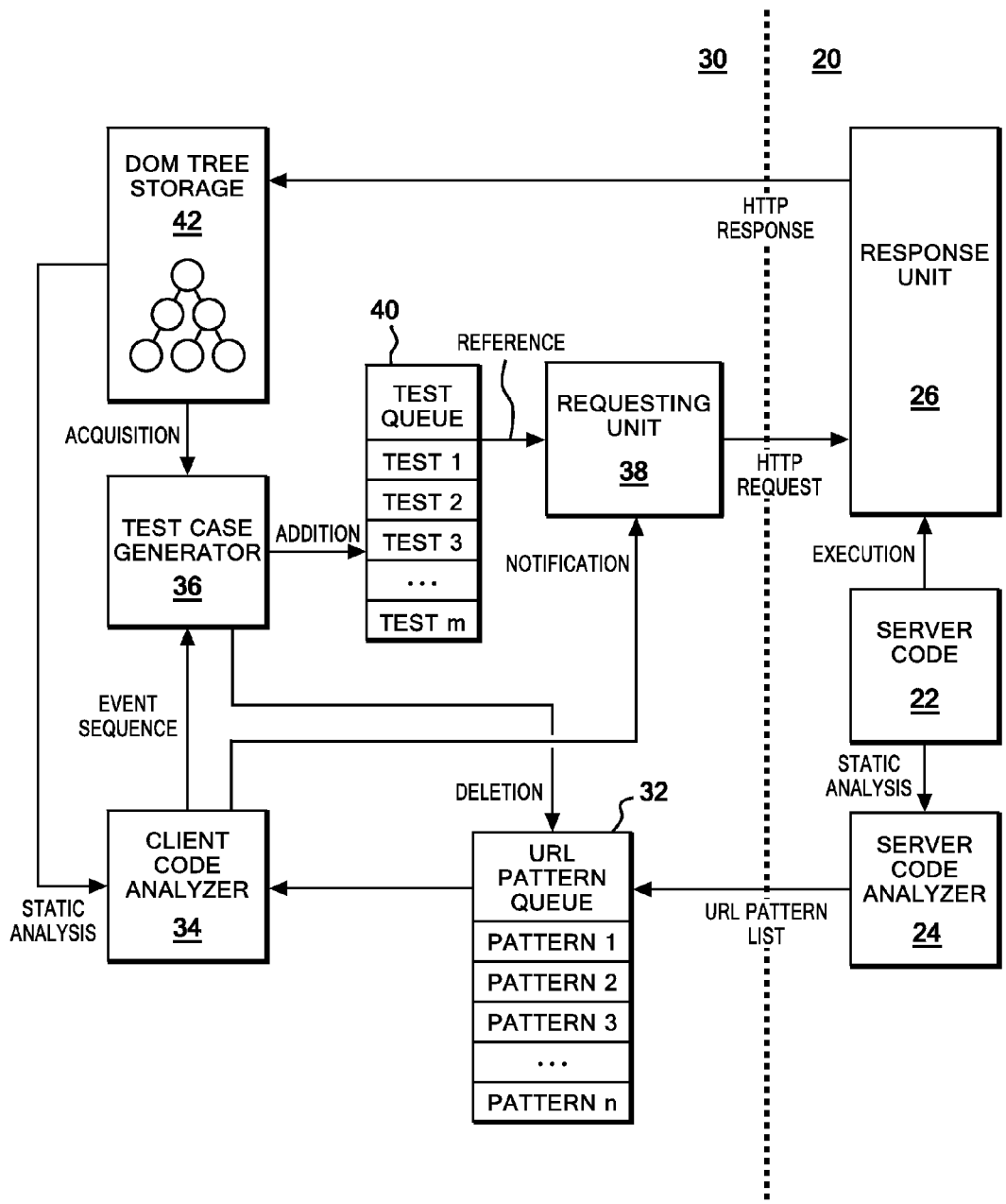
FIG. 2 shows a block diagram of functions implemented in the test environment according to the embodiment of the present invention.

FIG. 2 shows functional blocks implemented in the test environment 10 according to the embodiment of the present invention. The test environment 10 shown in FIG. 2 includes a server-side functional block 20 implementing the target application and a client-side functional block 30 for testing the target application. Function parts included in the server-side functional block 20 are implemented in the following manner. Specifically, the web application server 14 or the computer 18 shown in FIG. 1 reads a program from a computer-readable recording medium such as an HDD, loads the program into the memory, executes the program, and controls operations of hardware resources. The client-side functional block 30 is implemented in a manner that the computer 18 shown in FIG. 1 reads a program from a computer-readable recording medium, loads the program into the memory, executes the program, and controls operations of hardware resources.

The server-side functional block 20 includes: a server code 22 which describes the target application; a server code analyzer 24 which analyzes the server code 22; and a response unit 26 which processes HTTP requests from the client in accordance with the server code 22.

The server code 22 is described by using a technique of, for example, JSP, ASP, PHP or the like. For example, in JSP, the server code 22 is configured as a set of resource groups including a file with Java (registered trademark) code embedded in HTML. Being a function part which executes so-called static code analysis, the server code analyzer 24 analyzes the server code 22 of the target application, constructs a mathematical model describing the target application, and analyzes the model.

In this embodiment, the server code analyzer 24 performs the static code analysis on the server code 22, and thereby extracts URL patterns and parameter constraint conditions (hereinafter, a set of a URL pattern and a parameter constraint condition is referred to as a parameter-constrained URL pattern) included in the server code 22. Specifically, the URL pattern is expressed by associating a format of a URL with the parameter constraint condition to be described later, the URL including parameters embedded in a query character string. The URL pattern is typically configured of: a part including a scheme (e.g., http), an authority (e.g., www.xxxx.yy.xx) and a path (e.g., abc.jsp); and a part including a query character sting (e.g., parameter=value1). The described embodiment illustrates a case of using a URL as a resource identifier and a resource identifier pattern each of which indicates a resource on the network. However, the resource identifier and the resource identifier pattern are not limited to a URL, and are applicable to other resource identifiers such as a uniform resource name (URN).

The parameter constraint condition reflects a branching structure or the like of a target application, and defines a condition (e.g., value1>0) given to parameters which are set in the query character string. The parameter constraint condition can include various conditions related to the parameters, such as a range of a parameter value, a relationship with another parameter and the data type of the parameters. It should be noted that there can be a case where no parameter constraint condition is provided. The server code analyzer 24 analyzes the source code and extracts the parameter-constrained URL patterns so as to cover branching and conditions of the parameters according to the required coverage degree. The URL patterns can preferably be extracted by the static code analysis as disclosed in "A Static Analysis Approach for Automatic Generating Test Cases for Web Applications" by Minghui Wang, et. al, 2008 International Conference on Computer Science and Software Engineering, p751-754, December 2008.

An example is taken of the parameter-constrained URL patterns. Suppose a case where server code describes: acquisition of two parameters by a method request.getParameter; and processing to be performed when a certain magnitude relationship is satisfied. In this case, a URL pattern to be extracted is expressed as "http://localhost/page.jsp?a=z+b=y," and a parameter constraint condition is expressed as "z>y," for example.

In this embodiment, a part in code that describes processing according to the parameters received by the client is identified by statically analyzing the server code, and a URL pattern and a parameter constraint condition for accessing the part of the code are extracted. After completing the static analysis of the server code 22, the server code analyzer 24 hands over, to the client-side functional block 30, at least one parameter-constrained URL patterns included in the analysis result in a form of list data, for example.

Note that the server code analyzer 24 can be configured as an external module providing the list of parameter-constrained URL patterns to the computer 18 implementing the test tool. In addition, in another embodiment, the server code analyzer 24 can be incorporated into the test tool of this embodiment and be configured to execute the static analysis of the server code 22 on the computer 18, which in turn implements the test tool and then extracts parameter-constrained URL patterns.

The response unit 26 provides a web server function and an application server function which processes the server program such as JSP, ASP or PHP, where the server program operates as the target application. In response to an HTTP request from the client, the response unit 26 generates the client code in accordance with the server code 22, and then transmits an HTTP response.

The client-side functional block 30 includes a URL pattern queue 32, a client code analyzer 34, and a DOM tree storage 42. The URL pattern queue 32 is a waiting queue which temporarily holds the parameter-constrained URL patterns so that entries of test cases to be described later can be generated, the parameter-constrained URL patterns being transferred from the server code analyzer 24. The URL pattern queue 32 holds entries of the parameter-constrained URL to be processed later. After being processed, a corresponding entry is deleted from the URL pattern queue 32, or is given a check mark indicating that the entry has been processed.

The client code analyzer 34 is a function part which executes the static code analysis, and thus analyzes the client code acquired from the response unit 26 on the server side. Firstly, upon receipt of the client code from the response unit 26 on the server side, the client-side functional block 30 constructs a document object modeling (DOM) tree describing a state of the web client (referred as client state). The DOM tree is stored in the DOM tree storage 42 provided by a RAM or the like. The DOM tree holds elements described in the client code in a tree structure, enabling operations, reference and event processing of the elements which form a web page.

The client code analyzer 34 according to this embodiment performs the static code analysis on the acquired client code (client state), and detects an event sequence that matches with at least one of the entries held in the URL pattern queue 32. Specifically, an event sequence means a series of events executed on the client state.

The analysis of the client code analyzer 34 leads to a detection of an event sequence. The detection of an event sequence results from matching the generation of a requested URL (including specific input parameter values) with the entry of the parameter-constrained URL pattern. For example, the parameter-constrained URL pattern ("http://localhost/page.jsp?a=z+b=y", x>y), is matched with a series of events to be executed on the client side, where the series of events being "specific values satisfying the parameter constraint condition are inputted in the respective input boxes for two parameters a and b, and then the transmission button is clicked."

In addition, the client code analyzer 34 can also include a function of statically analyzing script code such as JavaScript (registered trademark) included in the client code. By statically analyzing or simulating the script code, the client code analyzer 34 can find an event sequence including a function call in the script code and the like.

The client-side functional block 30 shown in FIG. 2 further includes a test case generator 36, a requesting unit 38 and a test queue 40. From a given client state, when client code analyzer 34 finds at least one event sequences matching with at least one of the entries in the URL pattern queue 32, the client code analyzer 34 hands over the matched event sequence to the test case generator 36.

Then test case generator 36 receives the event sequence from the client code analyzer 34, and dynamically generates an entry of a test case (referred to as a test entry) by using the received event sequence. More specifically, the test case generator 36 fetches the client state from the DOM tree storage 42, executes the event sequence on the client state, and generates a requested URL as the execution result. Note that also the test case generator 36 can include a function of emulating execution of the script code in accordance with the script code included in the client code.

Thus, requested URL includes specific values matching with a parameter-constrained URL pattern that corresponds with the event sequence. For example, when the event sequence "specific values satisfying the parameter constraint condition are inputted in the respective input boxes for two parameters a and b, and the transmission button is clicked" is found, a requested URL "http://localhost/page.jsp?a=2+b=1," is generated. Thus, the requested URL matches with the parameter-constrained URL pattern ("http://localhost/page.jsp?a=z+b=y", x>y) corresponding to the event sequence.

Upon generation of the requested URL, the test case generator 36 stores a set of the fetched client state, the event sequence executed on the client state and the requested URL generated by the execution of the event sequence, as a test entry in the test queue 40. Then, test case generator 36 deletes the corresponding entry of the URL pattern from the URL pattern queue 32 or gives the entry a check mark indicating that the entry has been processed. As described above, by generating the test entry corresponding to the entry of the URL pattern queue 32, a part of the server code associated with the parameter-constrained URL pattern becomes covered in the test.

After detecting the event sequence, referring to the URL pattern queue 32, and analyzing the current client state, the client code analyzer 34 determines whether or not all the entries of the URL patterns are covered. If determining that not all of the entries are covered, the client code analyzer 34 notifies the requesting unit 38 of processing incompletion (incomplete=true) to continue generating a test entry for another parameter-constrained URL pattern in the URL pattern queue 32.

Upon receipt of the notification of the processing incompletion (incomplete=true) from the client code analyzer 34, the requesting unit 38 attempts to acquire a new client state by using the test entry in the test queue 40. More specifically, the requesting unit 38 issues an HTTP request based on the requested URL of the test entry, receives a new web page from the response unit 26 on the server side and thus acquires a new client state. Alternatively, the requesting unit 38 receives XML data from the response unit 26 on the server side, and acquires a new client state for the test entry by reflecting the data on the client state.

Upon acquisition of the new client state, the client code analyzer 34 executes the static code analysis for the new client state, and thus finds an event sequence. Accordingly, the test case generator 36 generates a new test entry from the newly found event sequence. Such process is repeated until all the entries in the URL pattern queue 32 are covered or until no new client state can be acquired.

Figure 3:
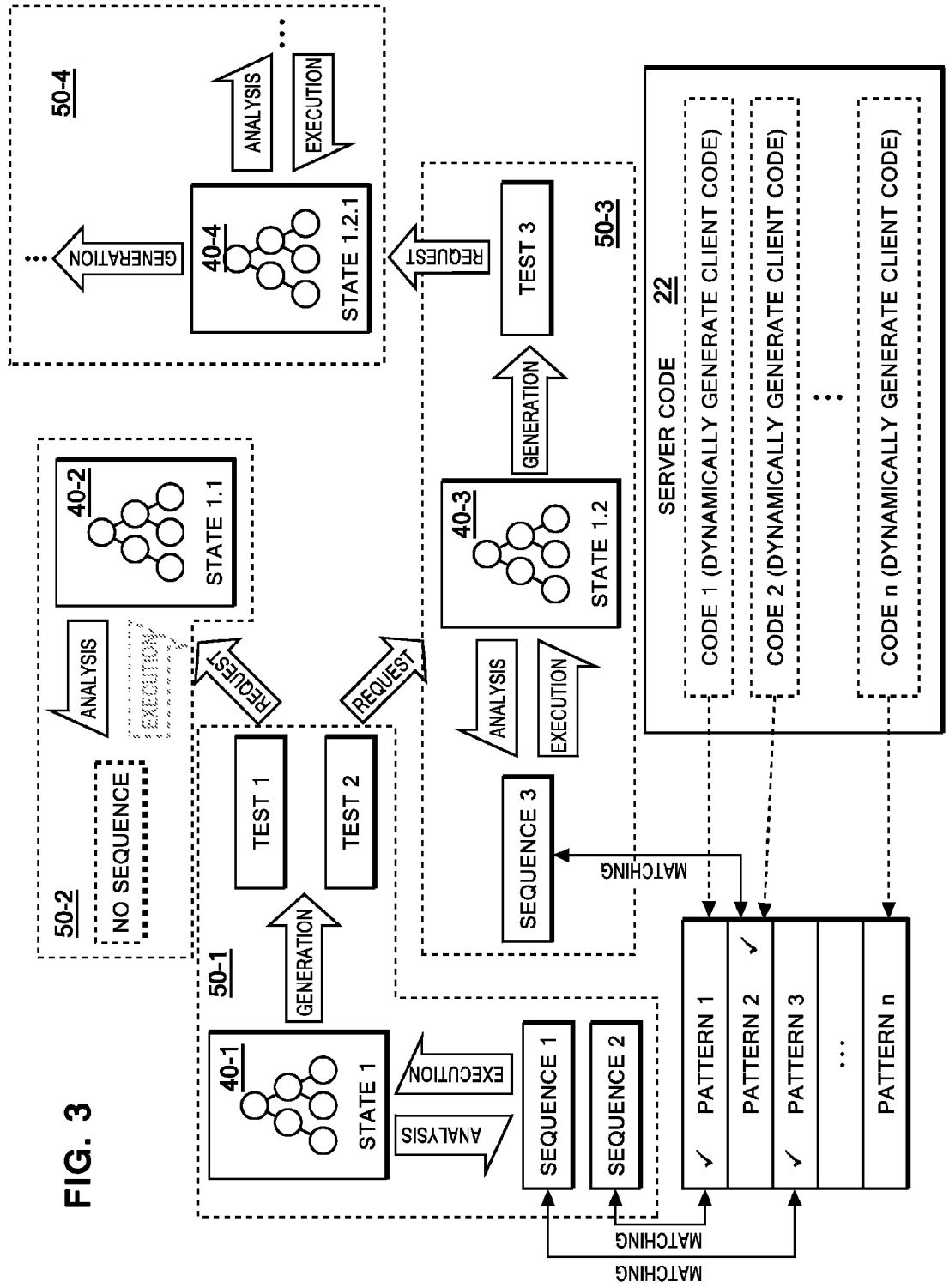
FIG. 3 shows a schematic diagram for explaining processing of dynamically generating test cases through interaction between the client and the server in the embodiment.

FIG. 3 shows a detailed scheme of the process that dynamically generates test cases through interaction between the client and the server. First, the static code analysis is performed on the server code of the target application, so the source code, which dynamically generates the client code, is identified, and a parameter-constrained URL pattern for accessing the code is extracted. The extracted parameter-constrained URL pattern is one to be tested through analysis on the client side. The test tool generates test cases to cover all the extracted URL patterns.

In the first cycle 50-1, the client code analyzer 34 analyzes a firstly given client state (State 1) and thus finds, for example, two event sequences (Sequence 1 and Sequence 2) respectively matching with two entries (Pattern 1 and Pattern 3) in the URL pattern queue 32. The test case generator 36 fetches the client state (State 1), executes the two event sequences (Sequences 1 and 2) on the client state, and generates two corresponding test entries (Test 1 and Test 2). In addition, the test case generator 36 gives check marks to the entries (Patterns 1 and 3) in the URL pattern queue 32 which correspond to the generated test entries, the check marks indicating that the entries have been processed.

Not being able to find an event sequence matching with another entry (for example, Pattern 2) in the URL pattern queue 32 from the firstly given client state (State 1), the client code analyzer 34 notifies the requesting unit 38 that the event sequence is not found (incomplete=true). The requesting unit 38 attempts to acquire a new client state by using the generated test entries. Two new client states (State 1.1 and State 1.2) are acquirable on the basis of the two test entries (Tests 1 and 2). The requesting unit 38 requests the server for a new client state by using, for example, one of the test entries (for example, Test 1), and thus acquires the client state (State 1.1). In this respect, the other test entry (Test 2) can be used in a case where a necessary new client state is not acquired based on the test entry (Test 1), although the case is not particularly limited thereto.

In the second cycle 50-2, the client code analyzer 34 analyzes the new client state (State 1.1), but does not find an event sequence matching with the entry in the URL pattern queue 32, from the client state (State 1.1). Thus, the requesting unit 38 acquires a new client state by using another test entry (Test 2 in this example).

In the third cycle 50-3, the client code analyzer 34 analyzes the newly acquired client state (State 1.2), and then finds an event sequence (Sequence 3) matching with, for example, the entry (Pattern 2) in the URL pattern queue 32. The test case generator 36 fetches the client state (State 1.2), executes the event sequence (Sequence 3) on this client state, and then generates a corresponding test entry (Test 3). In addition, the test case generator 36 gives a check mark to the entry (Pattern 2) in the URL pattern queue 32 which corresponds to the generated test entry (Test 3), the check mark indicating that the entry has been processed.

In this manner, the acquisition of a client state and the finding, from the client state, of an event sequence matching with an entry of a parameter-constrained URL pattern are iterated through interaction between the client and the server. When all the entries in the URL pattern queue 32 are covered, the processing of generating test cases for the target application is successively completed.

Figure 4:
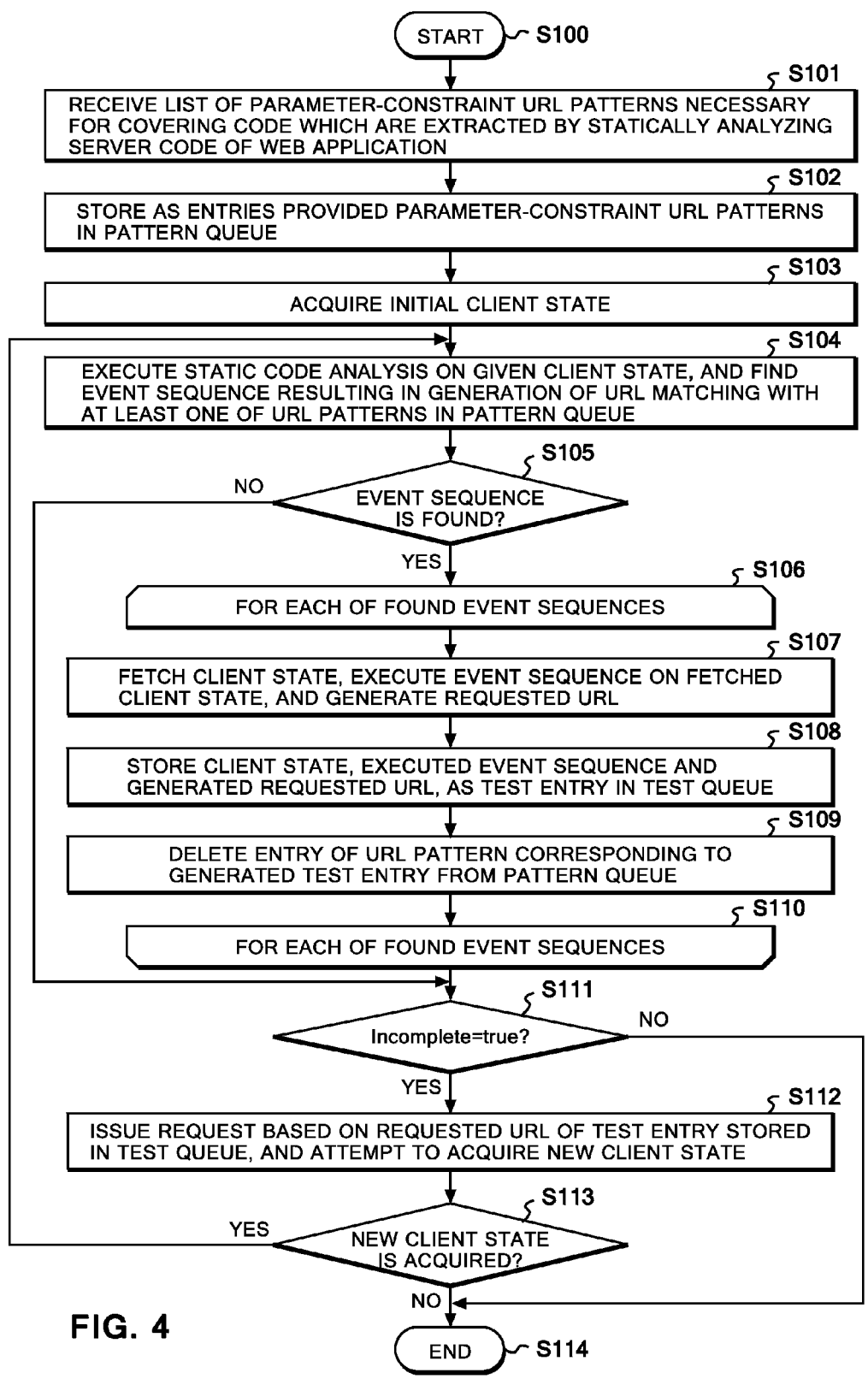
FIG. 4 shows a flowchart showing the test case generation processing executed by the computer implementing a test tool of the embodiment of the present invention.

A flow of the test case generation processing according to this embodiment of the present invention will be described by referring to FIGS. 4 to 5C. FIG. 4 is a flowchart showing the test case generation processing executed by the computer 18 implementing the test tool of this embodiment of the present invention. FIGS. 5A to 5C illustrate server code (5A) of a web application to be tested and generated client code (5B and 5C). The processing shown in FIG. 4 is started from Step S100 in response to an instruction given by an operator of the computer 18 for execution of the test case generation processing with the web application designated.

In Step S101, the computer 18 receives at least one parameter-constrained URL patterns extracted from the server code of the target application. When the server code analyzer 24 is implemented as the function part of the computer 18, the computer 18 causes the server code analyzer 24 to analyze the server code 22 and to extract at least one parameter-constrained URL patterns. When the server code analyzer 24 is implemented as an external function part of the computer 18, the computer 18 imports the analysis result of the server code 22, which includes at least one parameter-constrained URL patterns.

For example, when server code shown in FIG. 5A is given, Pattern 1 ("http://localhost/page.jsp?a=z+b=y", z>y) and Pattern 2 ("http://localhost/page.jsp?c=z+d=y", z>y) are extracted by statically analyzing the server code.

In Step S102, the computer 18 stores the above-described at least one parameter-constrained URL patterns in the URL pattern queue 32. In the example shown in FIGS. 5A to 5C, Patterns 1 and 2 are put in the URL pattern queue 32 as entries. In Step S103, the computer 18 accesses a URL designated as an initial page, receives client code, and acquires an initial client state. For example, the computer 18 accesses the URL "http://localhost/page_1.jsp," and acquires the client code shown in FIG. 5B.

In Step S104, the computer 18 causes the client code analyzer 34 to perform the static code analysis on the given client state and to attempt to find an event sequence resulting in generation of a requested URL that matches with at least one of the URL patterns in the URL pattern queue 32. In the example shown in FIGS. 5A to 5C, Sequence 1 ("a.value=2"→>"b.value=1" →"submit.click") corresponding to Pattern 1 is found by analyzing the client code shown in FIG. 5B. On the other hand, an event sequence which covers Pattern 2 is not found in the current client state.

If not all of the entries in the URL pattern queue 32 are covered as the result of the analysis of the current client state, the client code analyzer 34 notifies the requesting unit 38 of processing incompletion (incomplete=true). On the other hand, if all the entries in the URL pattern queue 32 are covered as the result of the analysis of the current client state, the client code analyzer 34 notifies the requesting unit 38 of processing completion (incomplete=false).

In Step S105, the computer 18 determines whether or not the above-described event sequence is found as a result of the analysis of the client code. If it is determined that the event sequence is found (YES), the processing proceeds to Step S106. On the other hand, it is determined that the event sequence is not found (NO), the processing proceeds to Step S111. Processing from Step S106 to Step S110 is executed for each of found event sequences.

In Step S107, the computer 18 causes the test case generator 36 to fetch a current client state for each found event sequence, to execute the event sequence on the client state, and to generate a requested URL. In the example shown in FIGS. 5A to 5C, Sequence 1 ("a.value=2"→"b.value=1"→"submit.click") is executed on the initial client state, and a requested URL (http://localhost/page_1.jsp?a=2+b=1) is generated as the execution result.

In Step S108, the computer 18 stores the fetched client state, the executed event sequence and the generated requested URL, as a test entry in the test queue 40. In the example shown in FIGS. 5A to 5C, the computer 18 stores the fetched client state, Sequence 1 ("a.value=2"→"b.value=1"→"submit.click") and the requested URL "http://localhost/page_1.jsp?a=2+b=1" as a test entry in the test queue 40.

In Step S109, the computer 18 deletes the entry of the URL pattern corresponding to the event sequence in the URL pattern queue 32 or gives a check mark to the entry. In the example shown in FIGS. 5A to 5C, since Sequence 1 ("a.value=2"→"b.value=1"→"submit.click") matches with Pattern 1 ("http://localhost/page_1.jsp?a=z+b=y", z>y), Pattern 1 is deleted from the URL pattern queue 32.

Upon completion of processing in Steps S106 to S110 for each found event sequence, the processing proceeds to Step S111. In Step S111, the computer 18 determines whether or not the processing is uncompleted (incomplete=true). If it is determined that the processing is uncompleted (YES) because the client code analyzer 34 has notified the requesting unit 38 of processing incompletion (incomplete=true), the processing proceeds to Step S112.

In Step S112, the computer 18 causes the requesting unit 38 to attempt to acquire a new client state by using a test entry in the test queue 40. In the example shown in FIGS. 5A to 5C, the requesting unit 38 requests a new client state by using the requested URL "http://localhost/page_1.jsp?a=2+b=1" included in the newly generated test entry. In this case, client code "http://localhost/page_2.jsp" is acquired by an action "forward" in JSP.

In Step S113, the computer 18 determines whether or not the new client state is acquired. If it is determined in Step S113 that the new client state is acquired (YES), the processing is iterated by going back to Step S104. On the other hand, if it is determined in Step S113 that the new client state is not acquired (NO) because, for example, there does not exist a test entry through which a new entry can be obtained, the processing is branched to Step S114. In this case, the test case generation processing is terminated with the entry left unprocessed in the URL pattern queue 32.

If it is determined in Step S105 that the event sequence is not found (NO) as a result of the client code analysis, the processing proceeds to Step S111. In this case, the client code analyzer 34 notifies the requesting unit 38 of processing incompletion (incomplete=true). The processing proceeds from Step S111 to Step S112, and the requesting unit 38 attempts to acquire a new client state by using another test entry in the test queue 40.

The description is continued by referring to the example shown in FIGS. 5A to 5C. In Step S104 which is executed in the second cycle, by analyzing newly acquired client code shown in FIG. 5C, the computer 18 finds Sequence 2 ("c.value=2"→"d.value=1"→"submit.click") which covers Pattern 2. In this case, since all the entries in the URL pattern queue 32 are covered as the result of the analysis of the newly acquired client state, the client code analyzer 34 notifies the requesting unit 38 of processing completion (incomplete=false).

In Step S107, Sequence 2 ("c.value=2"→"d.value=1"→"submit.click") is executed on the client state "http://localhost/page_2.jsp," and thereby a requested URL "http://localhost/page_2.jsp?c=2+d=1" is generated as the execution result. In Step S108, the fetched client state, Sequence 2 ("c.value=2"→"d.value=1"→"submit.click") and the requested URL "http://localhost/page_2.jsp?c=2+d=1" are accumulated as a test entry in the test queue 40. Since Sequence 2 ("c.value=2"→"d.value=1"→"submit.click") corresponds to Pattern 2 ("http://localhost/page_1.jsp?c=z+d=y", z>y), Pattern 2 is deleted from the URL pattern queue 32 in Step S109. In this case, since the requesting unit 38 receives the notification of process completion (incomplete=false) from the client code analyzer 34 (S111: NO), the processing proceeds from Step S111 to Step S114, so that the processing is terminated. In this case, the test case generation processing which has covered all the entries in the URL pattern queue 32 is successfully completed.

Figure 6:
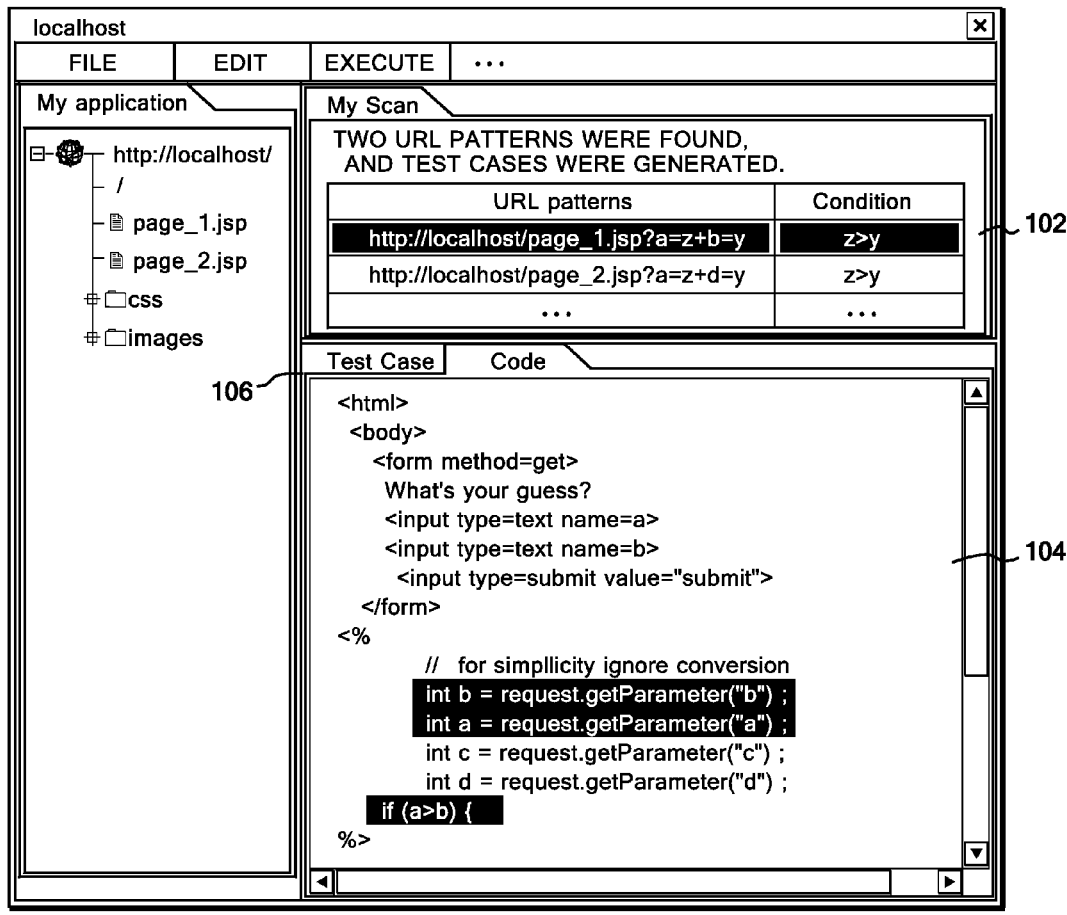
FIG. 6 shows a diagram illustrating a screen showing a result of the test case generation processing of the embodiment.
Figure 7:
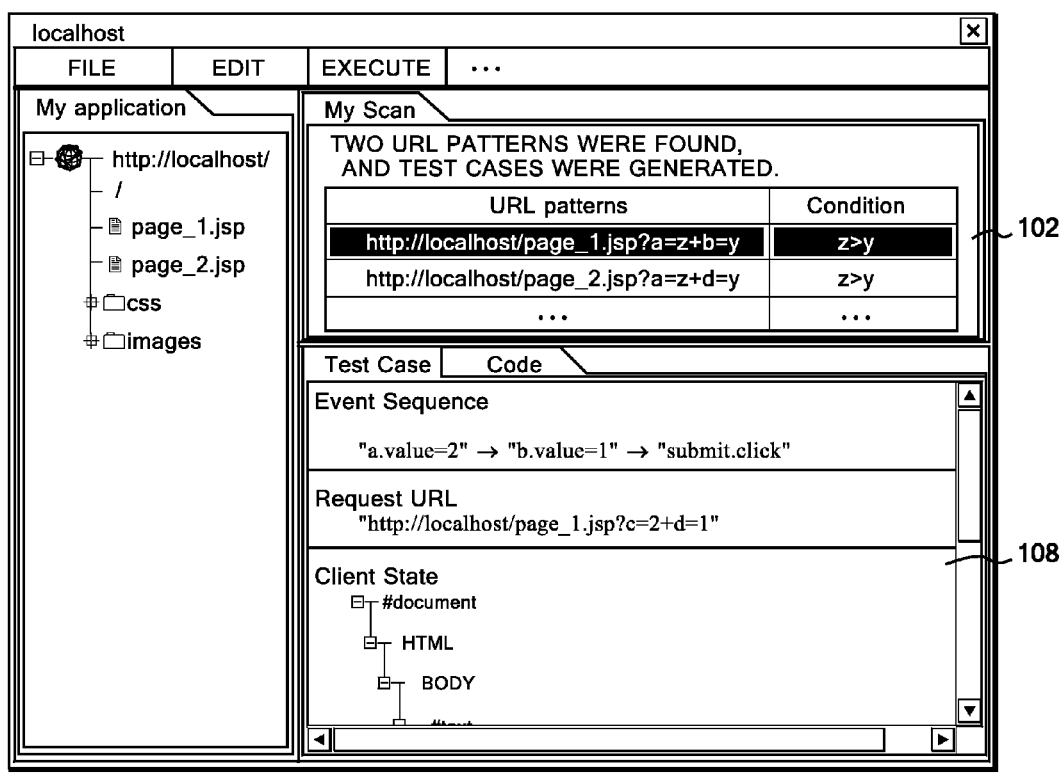
FIG. 7 shows a diagram illustrating another screen showing the result of the test case generation processing of the embodiment.

FIGS. 6 and 7 illustrate screens showing a result of the test case generation processing of this embodiment. A screen 100 shown in FIG. 6 includes a screen region 102 displaying URL patterns and parameter constraint conditions which are extracted as results of the static code analysis of the server code. The URL patterns and the parameter constraint conditions are each managed in association with a corresponding part (such as a code line) of the server code. For example, a screen region 104 highlights a part of the server code corresponding to a selected parameter-constrained URL pattern in the screen region 102.

In addition, the URL patterns and the parameter constraint conditions are each managed in association with a corresponding generated test entry. When a tab 106 is clicked on the screen 100 shown in FIG. 6, the screen 100 transitions as shown in FIG. 7. The screen 100 shown in FIG. 7 includes a screen region 108 which displays an entry of a test case corresponding to the selected parameter-constrained URL pattern. Associating the entry of the generated test case with the corresponding part of the server code in this manner makes it possible to know which part of the server code is covered, and further, for the operator to easily identify which part of the server code is associated with a URL pattern for which a test case is not generated.

As described above, in this embodiment, parameter-constrained URL patterns on which a control structure associated with the parameters in the target application is reflected are firstly extracted by statically analyzing the server code. Then, the computer serving as the client statically analyzes the client code acquired from the server, and searches for a client state and an event sequence resulting in generation of a requested URL corresponding to one of the URL patterns extracted as test targets. Thereby, the computer generates a test case for verifying the consistency between the server code and the dynamically generated client code.

Since test targets are given by statically analyzing the server code, what to be covered by the code coverage serving as a measure of the achievement degree of the test is made clear. This enables the code coverage to be verified correctly in the software test. Furthermore, based on a test entry generated from a certain client state, the computer 18 develops the client state while feeding back a result of interaction with the server to the client state, and searches the target application for an event sequence corresponding to one of the extracted URL patterns. Thereby, the computer 18 can efficiently generate test cases which cover the server code dynamically generating the extracted URL patterns, that is, the client code. According to this technique, for example, in a web application, such a code path that is not executed until a specific parameter is inputted can also be covered.

In addition, the test case generation processing of the present invention can effectively cope with an infinite loop which has been a problem in conventional dynamic analysis of a web application. By referring to FIGS. 8A to 9, a description is given of how the test case generation processing of the embodiment avoids the infinite loop.

FIGS. 8A and 8B illustrate pseudo code of server code (8A) and generated client code (8B) of the web application to be tested. When being given the code shown in FIGS. 8A and 8B, conventional dynamic analysis involving execution of the code causes a problem that the processing goes into an infinite loop once a function async_check_mail( ) is called in the client code shown in FIG. 8B. Accordingly, in the conventional dynamic analysis, a function button_click which is described after the function async_check_mail( ) is not executed, and thus a URL "http://localhost/page_z.jsp" can not be found.

Figure 9:
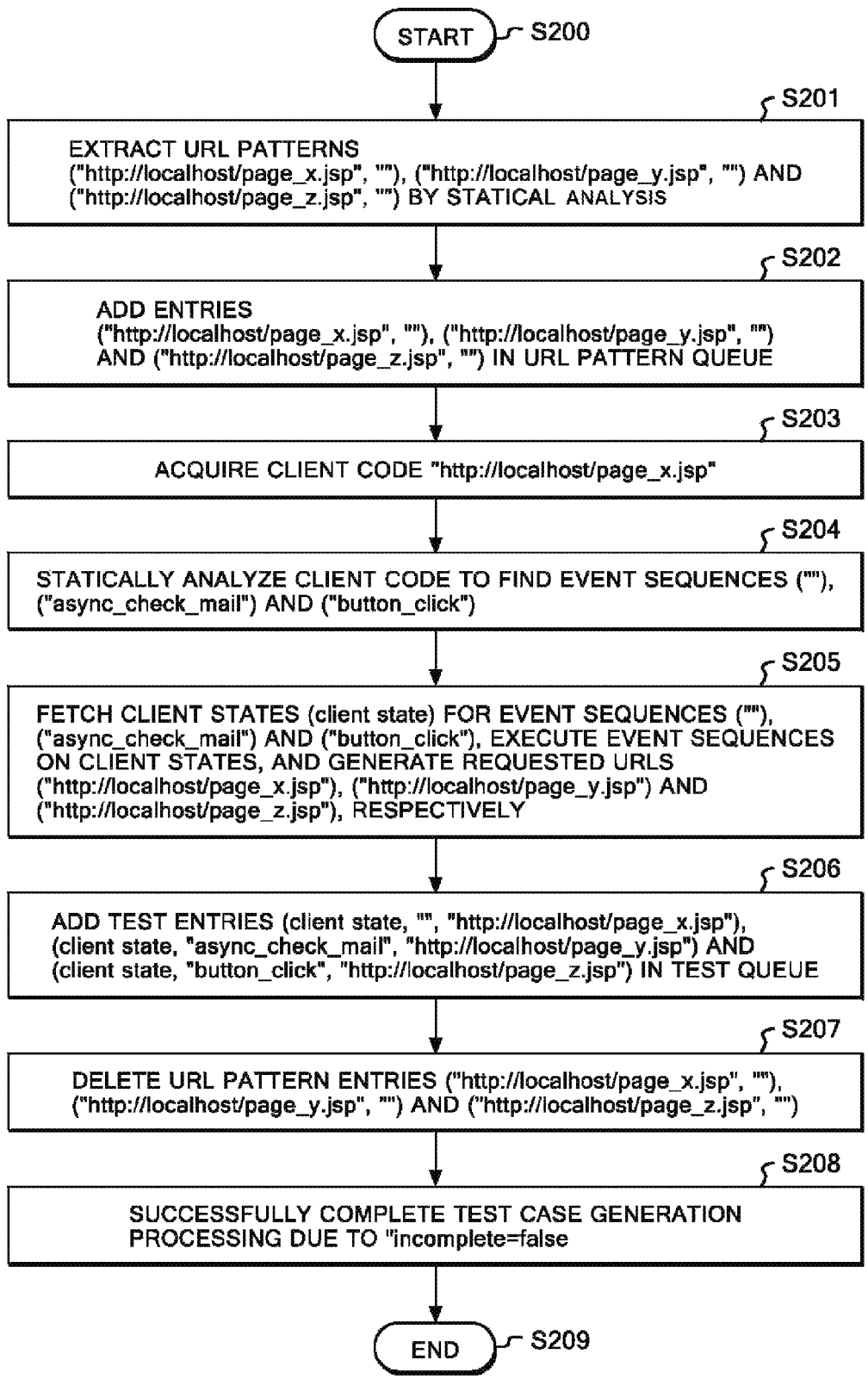
FIG. 9 shows a flowchart with an execution example of the test case generation processing of the web application to be tested.

FIG. 9 is a flowchart showing an execution example of the processing of generating test cases for the target application shown in FIGS. 8A and 8B. The processing shown in FIG. 9 is started from Step S200 in response to an instruction by the operator for execution of the test case generation processing with the web application designated.

In Step S201, the server code shown in FIG. 8A is statically analyzed, and thereby three parameter-constrained URL patterns ("http://localhost/page_x.jsp", " "), ("http://localhost/page_y.jsp", " ") and ("http://local host/page_z.jsp", " ") are extracted. In Step S202, the computer 18 adds the parameter-constrained URL patterns to the URL pattern queue 32. In Step S203, the computer 18 accesses, for example, a URL "http://localhost/," receives the client code shown in FIG. 8B, and thereby acquires an initial client state.

In Step S204, the computer 18 statically analyzes the client code, and thereby finds event sequences (" "), ("async_check_ mail") and ("button_click"). In this case, since all the entries in the URL pattern queue 32 are covered by the analysis performed on the current client state, the client code analyzer 34 notifies the requesting unit 38 of processing completion (incomplete=false).

In Step S205, the computer 18 fetches a client state for each of the event sequences. On a corresponding one of the client states, the computer 18 executes: the event sequence (" ") to generate a requested URL ("http://localhost/page_x.jsp"); ("async_check_mail"), ("http://localhost/page_y.jsp"); and ("button_click"), ("http://localhost/page_z.jsp").

In Step S206, the computer 18 adds test entries (client state, " ", "http://localhost/page_x.jsp"), (client state, "async_check_mail", "http://localhost/page_y.jsp") and (client state, "button_click", "http://localhost/page_z.jsp") in the test queue 40.

In Step S207, the computer 18 deletes the corresponding entries of the URL patterns in the URL pattern queue 32, ("http://localhost/page_x.jsp", " "), ("http://localhost/page_y.jsp", " ") and ("http://localhost/page_z.jsp", " "). In Step S208, the computer 18 completes the test case generation processing successfully because the requesting unit 38 has received the notification of processing completion (incomplete=false). In Step S209, the processing is terminated.

As described above, in the test case generation processing of this embodiment, searching is performed, through interaction with the server, for client states and event sequences each matching with a corresponding one of the URL patterns extracted as test targets by statically analyzing the server code. At this time, each of the event sequences is executed on the corresponding client state. Once a test entry matching with the extracted URL pattern is generated, this event sequence is no longer executed on the client state. This means that there is no possibility of going into an infinite loop.

Furthermore, in the test case generation processing of this embodiment, any possible event sequence (in the aforementioned example, " ", "async_check_mail( )" and "button_click( )") matching with an unprocessed parameter-constrained URL pattern is detected from one client state (in the aforementioned example, page_x.jsp) by statically analyzing the client code. This prevents incomplete searching due to the infinite loop which has been a problem in the conventional dynamic analysis.

As described above, the embodiment of the present invention can provide an information processing system, a test case generation method, and a recording medium by which test cases of a web application can be efficiently generated in such a manner that the code coverage can be correctly verified.

The embodiment of the present invention makes it possible to automatically generate test cases which completely cover parameter-constrained URL patterns to be tested, because an infinite loop is avoided and the target application is searched efficiently. This can significantly reduce manual works which incur a lot of costs.

Furthermore, the embodiment of the present invention enables complete tracking of the system by testing the entire web application of the test target. In addition, dynamic client code such as Ajax can be processed.

The test case generation processing in the embodiment of the present invention is applicable as a crawler in a security diagnostic tool of a web application, so that the code coverage can be enhanced. The enhancement of the code coverage increases a possibility of finding a bug in the web application, thus leading to cost reduction in application development.

The aforementioned functions of the present invention can be implemented by a machine-executable program written in an object-oriented programming language such as C++, Java (registered trademark), Java (registered trademark) Beans, Java (registered trademark) Applet, Java (registered trademark) Script, Perl or Ruby, and a database language such as SQL. The program can be stored in a machine-readable recording medium and thus be distributed, or can be transmitted and thus be distributed.

The present invention has been described above by using the specific embodiment, but is not limited thereto. The present invention can be changed within a range in which those skilled in the art can come up with by implementing another embodiment, or by adding any element to the present invention, or changing or omitting any element of the present invention. Any modes thus made should be included within the scope of the present invention, as long as these modes provide the same operations and advantageous effects as those of the present invention.

According to the configuration above, the information processing system: analyzes the client code generated from the server code of the web application; searches for a client state and at least one event sequences which match with at least one of the resource identifier patterns extracted beforehand as test targets by analyzing the server code; and generates a test case for verifying consistency between the server code and the dynamically generated client code. Since the resource identifier patterns are given by analyzing the server code, it is possible to clearly define what to be covered by the code coverage serving as a measure of the achievement degree of the test. This enables the code coverage to be verified correctly in a software test.

What is claimed is:

1. An information processing system that generates a test case for a web application, the system comprising:
   a memory;
   a processing unit in communication with the memory that performs a method comprising:
   storing at least one resource identifier patterns as an entry in a queue in said memory, wherein said resource identifier patterns comprise one or more parameter-constrained Uniform Resource Locator (URL) patterns that are extracted from a server code of a web application by analyzing said server code;
   analyzing a client code generated from said server code and finding at least one event sequences matching with said one or more parameter-constrained Uniform Resource Locator (URL) patterns; and
   fetching a client state established from said client code, executing said event sequences on said client state, and generating a test case, wherein said test case comprises a URL including specific values matching with a parameter-constrained URL pattern corresponding to said event sequence and generated as an execution result of said event sequence,
   marking or deleting a corresponding matching entry of the parameter-constrained Uniform Resource Locator (URL) pattern from said queue, and
   repeating said analyzing, finding, fetching, executing, test case generating and the marking or deleting steps until all entries in the queue are marked or deleted.

2. The system according to claim 1, further comprising:
   a requesting unit that develops a second client state through interaction with said web application and said test case.

3. The system according to claim 1, wherein said method performed by said processing unit further comprises: finding said event sequences until all said resource identifier patterns are covered or until no new client state is acquired.

4. The system according to claim 1, wherein said test cases are generated until all said resource identifier patterns are covered or until no new client state is acquired.

5. The system according to claim 1, wherein said test case further comprises said event sequence and said client state on which said event sequence has been executed.

6. The system according to claim 1, wherein said method performed by said processing unit further comprises:
   analyzing said server code and extracting at least one of said one or more parameter-constrained Uniform Resource Locator (URL) patterns.

7. A method for generating test case for a web application, the method comprising the steps of:
   storing at least one resource identifier patterns as an entry in a queue in a memory storage device, wherein said resource identifier patterns comprise one or more parameter-constrained Uniform Resource Locator (URL) patterns that are extracted from a server code of a web application by analyzing said server code;
   analyzing a client code generated from said server code;
   finding, from said client code, at least one event sequences matching with said one or more parameter-constrained Uniform Resource Locator (URL) patterns;
   fetching a client state established from said client code;
   executing said event sequences on said client state;
   generating a test case, wherein said test case comprises a URL including specific values matching with a parameter-constrained URL pattern corresponding to said event sequence and generated as an execution result of said event sequence,
   marking or deleting a corresponding matching entry of the parameter-constrained Uniform Resource Locator (URL) pattern from said queue, and
   repeating said analyzing, finding, fetching, executing, test case generating and the marking or deleting steps until all entries in the queue are marked or deleted.

8. The method according to claim 7, further comprises the step of:
   developing a second client state through interaction with said web application and said test case.

9. The method according to claim 7, wherein said step of finding at least one event sequences continues until all said resource identifier patterns are covered or until no new client state is acquired.

10. The method according to claim 7, wherein said step of generating said test case continues until all said one or more parameter-constrained Uniform Resource Locator (URL) patterns are covered or until no new client state is acquired.

11. The method according to claim 7, wherein said test case further comprises said event sequence and said client state on which said event sequence has been executed.

12. The method according to claim 7, wherein said step of storing at least one resource identifier patterns further comprises the steps of
   analyzing said server code; and
   extracting at least one of said one or more parameter-constrained Uniform Resource Locator (URL) patterns.

13. A computer readable storage medium tangibly embodying a computer readable program code, said computer readable storage medium is not a propagating signal, said computer readable code having computer readable instructions which when implemented, cause a computer to carry out the steps of a method comprising:
   storing at least one resource identifier patterns as an entry in a queue in a memory storage device, wherein said resource identifier patterns comprise one or more parameter-constrained Uniform Resource Locator (URL) patterns that are extracted from a server code of a web application by analyzing said server code;
   analyzing a client code generated from said server code;
   finding, from said client code, at least one event sequences matching with said one or more parameter-constrained Uniform Resource Locator (URL) patterns;
   fetching a client state established from said client code;
   executing said event sequences on said client state;
   generating a test case, wherein said test case comprises a URL including specific values matching with a parameter-constrained URL pattern corresponding to said event sequence and generated as an execution result of said event sequence,
   marking or deleting a corresponding matching entry of the parameter-constrained Uniform Resource Locator (URL) pattern from said queue, and
   repeating said analyzing, finding, fetching, executing, test case generating and the marking or deleting steps until all entries in the queue are marked or deleted.

14. The computer readable storage medium according to claim 13, further comprising the step of:
   developing a second client state through interaction with said web application and said test case.

15. The computer readable storage medium according to claim 13, wherein said step of finding at least one event sequences continues until all said resource identifier patterns are covered or until no new client state is acquired.

16. The computer readable storage medium according to claim 13, wherein said step of generating said test case continues until all said one or more parameter-constrained Uniform Resource Locator (URL) patterns are covered or until no new client state is acquired.

17. The computer readable storage medium according to claim 13, wherein said test case further comprises said event sequence and said client state on which said event sequence has been executed.

18. The computer readable storage medium according to claim 13, wherein said step of storing at least one resource identifier patterns further comprises the steps of:
   analyzing said server code; and
   extracting at least one of said resource identifier patterns.

* * * * *